(12) United States Patent
Pavlicic (10) Patent No.: US 7,904,725 B2
(45) Date of Patent: Mar. 8, 2011

(54) VERIFICATION OF ELECTRONIC SIGNATURES

(75) Inventor: Miladin Pavlicic, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 987 days.

(21) Appl. No.: 11/366,060

(22) Filed: Mar. 2, 2006

(65) Prior Publication Data

US 2007/0220259 A1    Sep. 20, 2007

(51) Int. Cl.
*H04L 9/32*    (2006.01)
(52) U.S. Cl. .......... 713/176; 713/178; 713/180; 713/155
(58) Field of Classification Search .................. 713/178, 713/176, 180, 155
See application file for complete search history.

(56) References Cited

U.S. PATENT DOCUMENTS

| | | | | |
|---|---|---|---|---|
| 4,868,877 | A * | 9/1989 | Fischer | 713/157 |
| 5,659,616 | A * | 8/1997 | Sudia | 705/76 |
| 6,301,658 | B1 * | 10/2001 | Koehler | 713/155 |
| 2002/0029337 | A1 * | 3/2002 | Sudia et al. | 713/176 |
| 2005/0210256 | A1 * | 9/2005 | Meier et al. | 713/176 |
| 2007/0186111 | A1 * | 8/2007 | Durand | 713/176 |
| 2007/0220259 | A1 * | 9/2007 | Pavlicic | 713/176 |

FOREIGN PATENT DOCUMENTS
KR    2001-0040248 A    5/2001

OTHER PUBLICATIONS

International Search Report PCT/US2007/003701, Aug. 6, 2007, pp. 1-9.
"XML Advanced Electronic Signatures (XAdES)", version 1.2.2, Apr. 2004.

* cited by examiner

*Primary Examiner* — Thanhnga B Truong
*Assistant Examiner* — Angela Holmes (57) ABSTRACT

A system verifies an electronic signature. The electronic signature may be associated with timestamps, each including a time value. A timestamp verification module detects invalid certificates in a certificate chain of the electronic signature and records an earliest invalidity time value of the invalid certificates. The verification module also verifies the timestamps associated with the electronic signature and records the time value of the earliest valid timestamp. A declaration module declares the electronic signature as valid if the time value of the earliest valid timestamp is earlier than the earliest invalidity time value of the one or more invalid certificates. The electronic signature may alternatively or additionally be associated with countersignatures. A countersignature verification module verifies the countersignatures associated with the electronic signature, and the declaration module declares the electronic signature as valid if all of the countersignatures are determined to be valid.

18 Claims, 4 Drawing Sheets

VERIFICATION OF ELECTRONIC SIGNATURES

BACKGROUND

Electronic commerce is an emerging method of transacting business between parties across local, wide area, and global networks. However, in order for electronic commerce to be considered a safe and reliable means of doing business, there must be suitable controls in place to protect the transaction and to ensure the trust and confidence of both parties in the transaction. For example, it is important that one party can rely on the acceptance of an offer by another party in an electronically conducted transaction within a regime providing effective legal protections.

In this respect, electronic signatures have been offered as an effective security component in protecting the information of a transaction and providing trust in electronic commerce. A European Directive defines an electronic signature as "data in electronic form which is attached to or logically associated with other electronic data and which serves as a method of authentication", although other definitions or variations of this definition are also employed. Generally, an electronic signature can provide evidence that a commitment has been explicitly endorsed under a signature policy, at a given time, by an identified signer, and optionally, a role. The signature policy specifies the technical and procedural requirements on signature creation and verification in order to meet a particular business need.

A given legal framework may recognize a particular signature policy as meeting its statutory, regulatory, and judicial requirements. For example, a specific signature policy may be recognized by courts of law as meeting the legal requirements for electronic commerce. Accordingly, within this legal framework, a holder of an electronic contract can provide evidence that a contract was electronically signed by another party and is therefore enforceable against that party.

Verification of basic electronic signatures generally involved certain cryptographic checks. However, verification becomes more complex a problem when one must account for revocation or expiration of electronic signatures over time. Furthermore, addition of advanced features to electronic signatures, such as qualifying properties, timestamps, and countersignatures, can contribute to long term signature validity and non-repudiation of an original signature but such features can also complicate the signature validity verification process. Existing approaches fail to provide a robust and effective verification of such advanced electronic signatures, particularly in the presence of multiple timestamps and countersignatures.

SUMMARY

Implementations described and claimed herein address the foregoing problems by providing a system for verifying an electronic signature. The electronic signature may be associated with timestamps, each timestamp including a time value. A timestamp verification module detects invalid certificates in a certificate chain of the electronic signature and records an earliest invalidity time value of the invalid certificates. The verification module also verifies the timestamps associated with the electronic signature and records the time value of the earliest valid timestamp. A declaration module declares the electronic signature as valid if the time value of the earliest valid timestamp is earlier than the earliest invalidity time value of the one or more invalid certificates. The electronic signature may alternatively or additionally be associated with countersignatures. A countersignature verification module verifies the countersignatures associated with the electronic signature, and the declaration module declares the electronic signature as valid if all of the countersignatures are determined to be valid.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Figure 1:
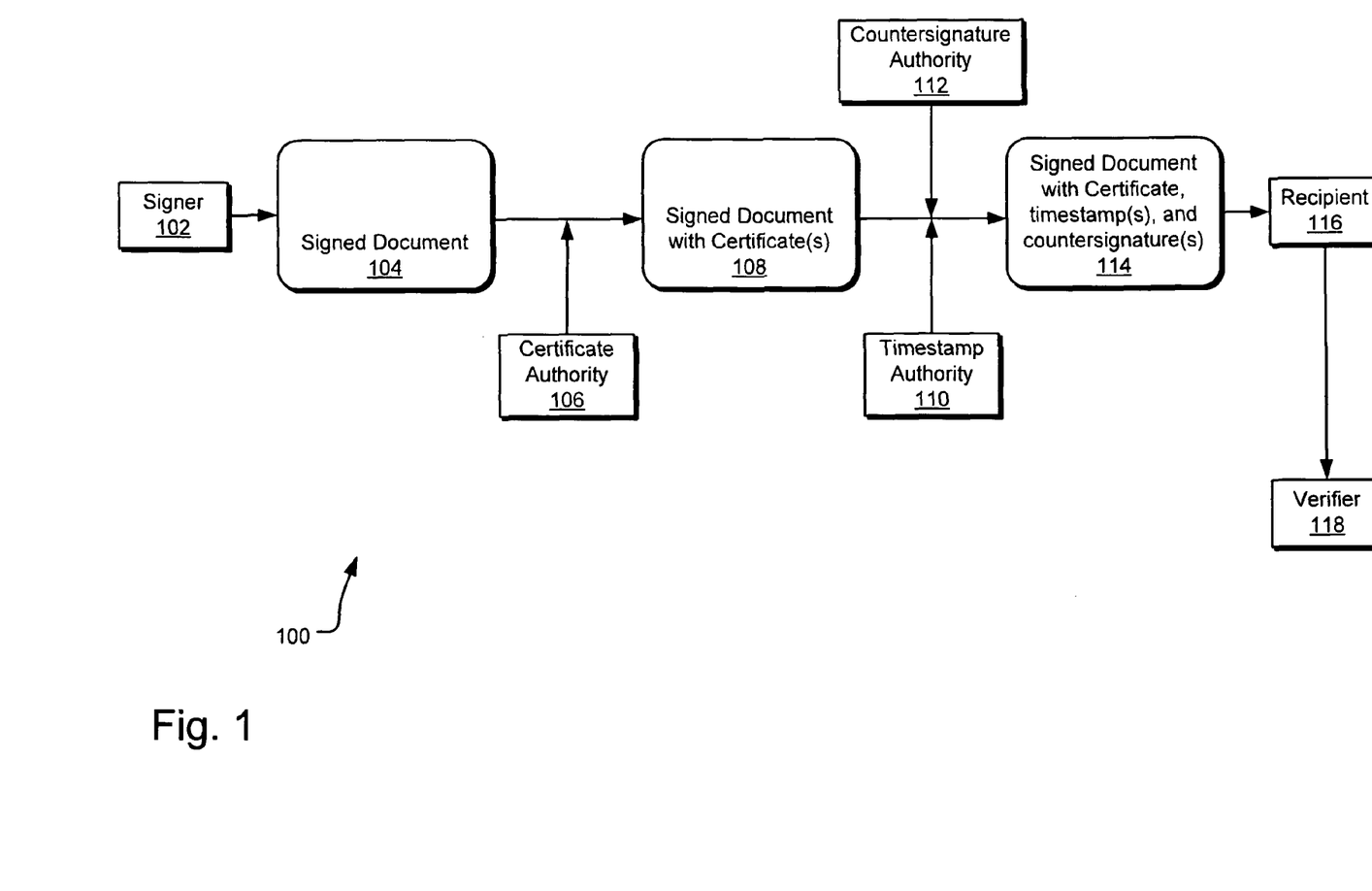
FIG. 1 illustrates an example process for generating and verifying electronically signed data.

FIG. 1 illustrates an example process 100 for generating and verifying electronically signed data. A signer 102 associates an electronic signature with an electronic document. An electronic signature can be used with any kind of data (e.g., a document, a message, a file, etc.), whether encrypted or not, to authenticate the identity of the signer or sender of the data and to ensure that the original content of the data is unchanged from the time of signing.

In one implementation, for example, the signer 102 creates an electronic signature by executing a hashing algorithm on the digital data that defines a document. Example hashing algorithms may include without limitation variations of Secure Hash Algorithm (SHA), Message Digest Algorithm (MDA), and Race Integrity Primitives Evaluation Message Digest (RIPEMD). Execution of the hashing algorithm on the digital data yields a hash result, often referred to as a "hash" or digest. The signer 102 can then use a private key obtained from a public-private key authority to encrypt the signature digest. The encrypted signature digest represents a basic component of an electronic signature (as signature value) associated with the data. The signature value can be transmitted or stored in association with the digital data.

Upon receiving the data and the signature value, a recipient 116 can then use a verifier 118 to verify the received digital data. For example, the verifier 118 can use the signer's public key (available from the signer, a public-private key authority, or some other source) to decrypt the encrypted signature digest associated with the document (ostensibly yielding the original signature digest). The verifier 118 can also generate a hash of the received digital data. If the hash of the received digital data and the decrypted signature digest match, validity of the basic electronic signature, and therefore the received digital data, is considered verified, at least at a basic level.

That is, absent other security problems, the signature is considered to be that of the signer and the document is unchanged from the time of signing.

Accordingly, by associating the document with an electronic signature, the signer 102 creates a signed document 104 that can be verified at some level by a recipient 116 or a verifier 118. It should be noted that the electronic signature can be associated with the document in several different ways, including: embedding the electronic signature in the document, embedding the document in the electronic signature, referencing the document in the electronic signature, referencing the electronic signature in the document, and storing the document and electronic signature in association with each other (e.g., in the same file system directory or folder).

Nevertheless, this basic level of verification still exhibits considerable trust concerns. For example, the verifier 118 making the assumption that the public key used to decrypt the encrypted signature digest actually belongs to the signer and is still valid. However, the public key may no longer be valid (e.g., the corresponding private key has been stolen, the signer is no longer authorized to use the private key, etc.).

Accordingly, the electronic signature can be certified by one or more trusted parties (such as certificate authorities 106 or some other certification entities, collectively referred to herein as "certificate signers") to attest that the public key belongs to a specified signer. Generally, a certificate uses an electronic signature to bind together a public key with an identity—information such as the name of a person or an organization, the public key owner's address, etc. An example certificate may include the public key being signed, a name or identifier of a person, a computer or an organization, a validity period, and an address (e.g., a URL) of a revocation center, although other forms of certificates may be employed. In a typical public key infrastructure (PKI) scheme, for example, data can be certified by a trusted certificate authority (CA). In a web of trust scheme, a certificate can be signed by the signer (a self-signed certificate) or other users ("endorsements"). In either case, electronic signatures on a certificate are attestations by the certificate signer that the identity information and the public key belong together.

Certificates can be used for the large-scale use of public key cryptography. Securely exchanging secret keys among a multitude of users becomes impractical and unsafe without additional protections. For example, if a first party wants others to be able to send him or her secret messages, the first party can publish a public key associated with the first party. Anyone possessing the public key can then send the party secure information. Unfortunately, a second party can also publish a public key claiming that the public key belongs to the first party and can therefore receive secret messages intended only for the first party. However, if the first party builds his or her public key into a certificate and has it digitally signed by a trusted third party (e.g., a certificate authority), anyone who trusts the trusted third party can merely check the certificate to see whether the trusted third party has certified that the embedded public key belongs to the first party. In this manner, a sender of secret information to the first party can have confidence that only the first party can access the secret message. By analogy, certification can allow a verifier to have confidence that an electronic signature actually belongs to the signer.

Further, in large-scale deployments, chains of certificates may be employed. For example, the first party may not be familiar with a second party's certificate authority, so the second party's certificate may also include his or her certificate authorities public key signed by a "higher level" certificate authority (e.g., a commercial certificate authority), which might be recognized by the first party. This process can lead to a chain of certificates, all of which are certified by an ultimately trusted party, that in combination attest that a public key belongs to a specified individual.

However, certification has its own security concerns. Some certificates have a limited validity period, outside of which the certificate is considered expired. In addition, a certificate may be revoked, for example, if it is discovered that its related private key has been compromised (e.g., the certificate authority's systems have been hacked) or if the relationship between a signer and a specific public key embedded in the certificate is discovered to be incorrect or has changed (e.g., if a person changes jobs or names). One method for determining whether a certificate has been revoked is compare the certificate against a certificate revocation list (CRL)—a list of revoked or cancelled certificates. Another method of determining the validity of a certificate is to query the certificate authority using the Online Certificate Status Protocol (OCSP) to obtain the status of a specific certificate.

Therefore, while certification provides some confidence that the electronic signature associated with a document is that of a specified signer, it is possible that the certificate itself had expired or was revoked (collectively referred to as "invalidated") at the time it was associated with the electronic signature. For example, assume the signer 116 electronically signs the document and has the electronic signature certified with a revoked certificate. Because the certificate was revoked at the time the signature was certified, the verifier 118 cannot sufficiently demonstrate for evidentiary purposes that the signer 116 actually signed the document (e.g., the hacker of the certificate authority could have stolen the certificate, signed the document, and certified his own signature as that of the signer 116).

To provide protection in such circumstances, timestamps can be used to enhance the security of advanced electronic signatures. A timestamp is a type of electronic signature that can be obtained from a trusted third-party (e.g., a timestamp authority 110) to attest that the certificate or certificate chain of the electronic signature existed and was valid at the time specified in the timestamp. In one implementation, the timestamp authority 110 verifies the electronic signature and the certificate chain. If these are valid, then the timestamp authority 110 hashes a collection of timestamp data, which includes a time value and the electronic signature digest, and associates the timestamp hash with the electronic signature. The timestamp can also be certified by one or more trusted third parties.

Assuming verification of the basic electronic signature, including associated qualifying properties and certificates, is accomplished, one or more timestamps associated with the electronic signature can be verified to determine whether the electronic signature and certificates were valid at the time of signing. If no certificate of the electronic signature was invalid at the time specified in the timestamp, then validity of the electronic signature is said to be verified as of the time specified in the timestamp. If the certificate or certificate chain of the electronic signature was revoked after the time of the timestamp, the trust in the electronic signature is unimpaired because validity has at least been verified at one point in time.

However, certificates associated with timestamps may also expire or be revoked. This situation does not mean that the electronic signature is invalid, just that a timestamp of the electronic signature cannot be trusted. Accordingly, a possessor of an electronically signed document may submit the electronic signature to one or more timestamp authorities over time, thereby associating multiple timestamps with the electronic signature. For example, a company may submit its existing contracts to a timestamp authority on an annual basis to reinforce the validity of the electronically signed document. In this manner, the company obtains multiple attestations that at a given time the electronic signature was valid. If one or more timestamps are found to be revoked, then it is likely that another timestamp remains valid, thereby preserving the validity of the electronic signature, at least at one point in time.

In addition, an electronic signature value in an advanced electronic signature may be associated with one or more electronic countersignatures from third parties (e.g., a countersignature authority or some other party, collectively referred to as "countersignature entities"). An electronic countersignature represents approval or notarization of the original signer's electronic signature by another party. An electronic countersignature may also be certified by one or more certificates. For example, execution of a document may require an electronic signature from two or more parties before it is considered legally binding. Accordingly, a countersignature represents an electronic signature of an identified second party and is associated with the same data electronically signed by the identified first party. A countersignature effectively signs an existing signature associated with the data. One or more countersignatures may be associated with a single document. An electronic countersignature may also be associated with its own timestamp(s) and/or countersignature(s).

A signed document 114 associated with an electronic signature certificate (or chain of certificates), zero or more time stamps, and zero or more countersignatures can then be transmitted to a recipient 116. If the recipient 116 wishes to verify the validity of the electronic signature associated with the signed document 114, the verifier 118 (e.g., a verification module of a document manager, a file manager, an email client, etc.) can receive the signed document 114 and test the electronic signature, timestamps, and/or countersignatures to verify the validity of the electronic signature. In the presence of multiple timestamps and/or multiple countersignatures, an implementation of the verifier 118 can declare the electronic signature as "valid", "valid at a specified point in time", or "invalid" (i.e., not verifiable, which suggests that the electronic signature cannot be trusted). The verifier 118 may also generate other declarations about the verification status on the electronic signature.

In another implementation, the verifier 118 can provide more detailed results:

| Result | Description |
| --- | --- |
| InvalidCertificateChain | One of the certificates on the certificate chain is invalid (revoked or expired) and no timestamps were found to evidence validity at some previous time |
| InvalidCertificateStatusUnknown | Full verification of the signing certificate could not be performed (e.g., could not connect online to check the certificate chain for revocation) |
| InvalidCertificateUsage | The intended usage of the certificate used for signing does not satisfy the usage requirements |
| InvalidCounterSignature | Signature contains at least one invalid countersignature |
| InvalidQualifyingProperties | The qualifying properties inside the signature are invalid (e.g., schema does not match or mandatory parts are not present) |
| InvalidSignatureValue | The signature value was cryptographically invalid (e.g., the data was tampered with) |
| InvalidTimeStamp | Signature contains at least one invalid timestamp |
| Valid | Signature is fully valid |
| ValidAtSigning | There are invalid certificates on the certificate chain but the signature is valid because it contains a valid timestamp providing its full validity at the time of signing (alternatively, at the time of the time-stamping, which could have been well after signing) |
| ValidNonQualifiedSignature | The signature is valid cryptographically, but additional checks cannot be performed because the signature is not an advanced electronic signature |

Figure 2:
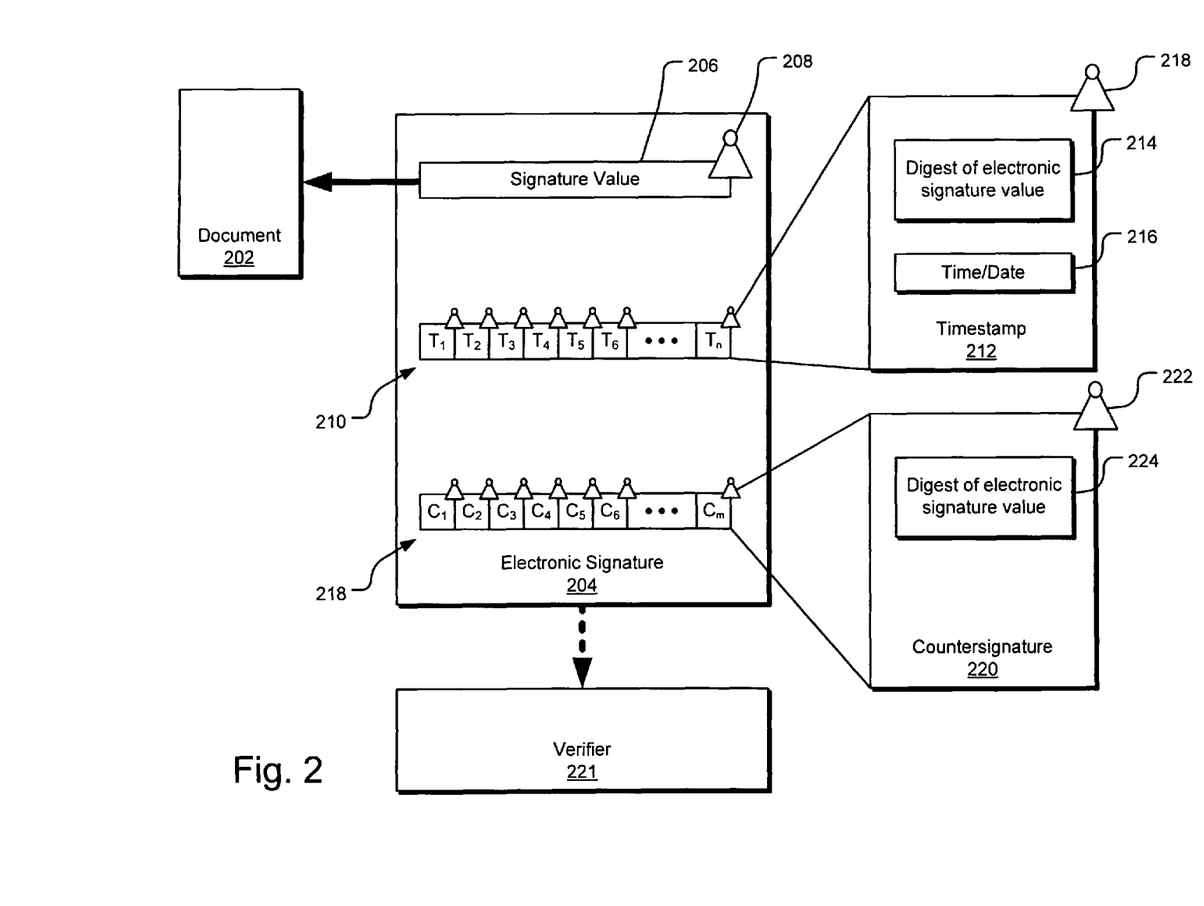
FIG. 2 illustrates input to an example verifier of an electronically signed document.

FIG. 2 illustrates input to an example verifier of an electronically signed document 202. An electronic signature 204 is associated with the electronic document 202. Such association can be achieved through a variety of methods, as discussed above, although for the purposes of the description, it will be assumed that the electronic signature is embedded in the electronic document 202. The electronic signature 204 includes a signature value 206 (with or without a certificate), zero or more timestamps 210 (with or without certificates), and zero or more countersignatures 218 (with or without certificates). In one implementation, the signature value 206 is generated by hashing the digital data that defines the electronic document 202 to create a digest of the electronic signature 204 and then encrypting the digest using the signer's private key.

The signature value 206 may also be certified by a certificate 208. The certificate 208 may be a single certificate or a chain of certificates. As discussed previously, one or more certificates associated with the signature value 206 may be invalid at the time of signing (or at the time of verification). The electronic signature 204 may also be associated with one or more timestamps 210, as shown in FIG. 2.

Timestamps can be added by a timestamp authority, which optionally tests the electronic signature value 206 and the certificates 208 associated therewith. An example timestamp is shown in an exploded view in timestamp 212 to include the digest 214 of the electronic signature value 206 and a time value 216 (e.g., include time and date information). Other parameters can also be combined in the timestamp 212, including without limitation qualifying properties, the hashing algorithm type, etc.

In one implementation, the timestamp authority receives the digest 214 of the signature value 206, combines the digest 214 with a time value 216 (e.g., including time and date information) and potentially other parameters, hashes the combination, encrypts the hashed combination with the timestamp authority's private key (signs it), and sends the signed result back to the original signer for association with the document 202. In an alternative implementation, the timestamp authority receives the electronic signature 204 and verifies the electronic signature value 206 and certificates 208. If these are valid, the timestamp authority hashes the electronic signature value 206 to obtain a new signature digest 214. The timestamp authority then hashes a combination of the new signature digest 214, the time value 216, and potentially other parameters, encrypts the hashed combination with the timestamp authority's private key (signs it), and sends the signed result back to the original signer for association with the document 202. The timestamp 212 may also be certified by one or more certificates 218 and may be associated with its own timestamps and countersignatures.

Each timestamp 210 attests to a time (e.g., a date and time value) at which the electronic signature existed in its specific form. Later, the one or more timestamps 210 can be verified by a verifier 221 to determine the earliest time at which the electronic signature was valid in association with the document 202. For example, company A has an agreement electronically signed by company B and wishes to enforce the agreement in a court of law. Company B repudiates the agreement, claiming that the signature is not valid, pointing out that one of the certificates in the certificate chain of the electronic signature had been revoked. If company A can verify a timestamp with a time prior to the revocation date, company A can adduce reliable evidence that the electronic signature was valid at least at one point in time and is therefore enforceable.

The electronic signature 204 may also be associated with one or more countersignatures 218, as shown in FIG. 2. Countersignatures can be added by a countersignature authority, which can optionally test the electronic signature value 206 and the certificates 208 associated therewith. An example countersignature is shown in an exploded view in countersignature 220 to include the digest 224 of the electronic signature value 206. Other parameters can also be combined in the countersignature 220, including without limitation qualifying properties, the hashing algorithm type, etc.

In one implementation, the countersignature authority receives the digest 224 of the signature value 206, hashes the digest 224, encrypts the hashed digest with the countersignature authority's private key, and sends the encrypted result (i.e., countersignature 220) back to the signer for association with the document 202. In an alternative implementation, the countersignature authority receives the electronic signature 204 and verifies the electronic signature value 206 and certificates 208. If these are valid, the countersignature authority hashes the electronic signature value 206 to obtain a new signature digest 224. The countersignature authority then hashes the new signature digest 224, encrypts the hashed result with the countersignature authority's private key (signs it), and sends the signed result (countersignature 220) back to the original signer for association with the document 202. The countersignature 220 may also be certified by one or more certificates 222 and may be associated with its own timestamps and countersignatures.

Each countersignature 220 represents an approval or notarization of the electronic signature 204 associated with the document 202. For example, if signatures of both parents are required in association with a child's signature on an electronic document, the parents' signatures can be provided as electronic countersignatures 218. In order for the electronic signature 204 to be verified, the verifier 221 validates all of the countersignatures 218.

It should be understood that the electronic signature 204 may not include a set of one or more timestamps or a set of one or more countersignatures. Nevertheless, verification of the electronic signature 204 can be made more robust by inclusion of one or more of these components.

Figure 3:
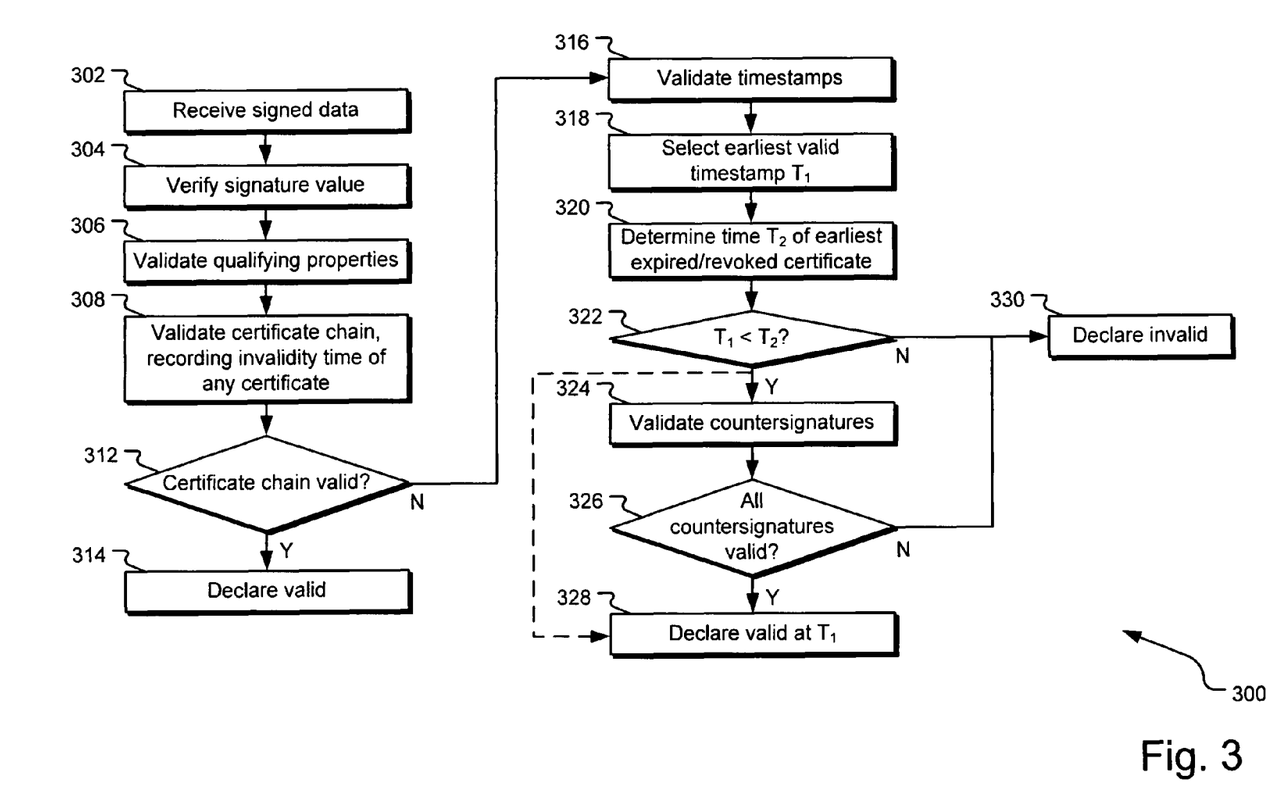
FIG. 3 illustrates example operations for verifying electronically signed data.

FIG. 3 illustrates example operations 300 for verifying electronically signed data. A receiving operation 302 receives signed data, such as a signed document or message, in a form similar to that shown in FIG. 2. The signed data may include certificates associated with the electronic signature, timestamps, and/or countersignatures. Examples of signed data may include with limitation audit trails of business transactions, medical guidelines in an electronic medical system, Internet tax return submissions signed using a citizen's electronic ID car or SOAP (Simple Object Access Protocol) messages used for communication between Web services, microfilm images in paper publications, etc.

A verification operation 304 verifies the basic electronic signature value. In one implementation, verification of the basic electronic signature includes using the signer's public key to decrypt the electronic signature value associated with the signed data to obtain the electronic signature digest. The verification operation 304 also generates a hash of the received data. If the hash matches the electronic signature digest, then the basic electronic signature value is considered verified. If the hash does not match the electronic signature digest, then the verification operation 304 declares the validity of the basic electronic signature value to be "unverifiable", which means that the electronic signature associated with the data may not be trustworthy because the data or the signature itself may have been tampered with.

A validation operation 306 examines any qualifying properties that may be present for the electronic signature. Some examples of qualifying properties may include without limitation signing location and time, the signer's role in a company, an indication of the type of commitment expressed by signing (e.g., document author, approver, executor of a contract, etc.), and other information. For example, the signature verification policy specifies how particular qualifying properties need to be validated. For example, such a policy may require a certain location at which the signature must have been produced.

Another validation operation 308 validates the certificate chain (e.g., one or more certificates) associated with the basic electronic signature value. The validation operation 308 compares the current time (e.g., date and time) to the validity period of the certificate to determine whether the certificate has expired. Likewise, the validity operation 308 consults a revocation list or the certificate authority to determine whether the certificate has been revoked. If one or more certificates are determined to be expired or revoked, a decision operation 312 will detect the invalidity and direct processing to a validation operation 316 if any timestamps are associated with the electronic signature. The expiration time, based on the validity period of the certificate, and the revocation time, based on the revocation information from the revocation list or certificate authority, are collectively termed "invalidity times".

Generally, a certificate represents an electronic signature that binds together a public key with an identity. The validation operation 308 works its way up the certificate chain, from least trusted certificate to most trusted certificate. For example, the validation operation 308 can obtain a public key from the certificate authority associated with the least trusted certificate in the chain. The validation operation 308 then decrypts the certificate using this public key and extracts a certified public key from the decrypted certificate. If the public key used to verify the electronic signature value and the certified public key match, and the certificate is not expired and has not been revoked by the certificate authority, then the certificate is deemed valid. If the certificate is determined to be currently invalid, the time (e.g., date and time) that the certificate expired or was revoked is recorded.

Then, the verification operation 308 can obtain a public key from the certificate authority associated with the next least trusted certificate in the chain. The validation operation 308 then decrypts the certificate using this public key and extracts a certified public key from the decrypted certificate. If the public key used to verify the lower level certificate and the current certified public key match, and the current certificate is not expired and has not been revoked by the certificate authority, then the certificate is deemed valid. This processing continues up the certificate chain until the certificate of the most trusted certificate authority is verified, at which point the certificate chain is considered valid.

In one implementation, the certificate usage is evaluated (e.g., some certificates are not intended for data signing) in accordance with an intended usage parameter in the certificate. If any certificate is determined to be corrupted (e.g., the data has been tampered with, corrupted during transmission, etc.), then the validity of the certificate is not verifiable and therefore neither is the validity of the electronic signature.

The decision operation 312 determines whether any of the certificates in the certificate chain were found to be invalid (e.g., revoked or expired). If not, then the electronic signature is declared valid in declaration operation 314. In an alternative implementation and/or for a configuration of electronic signature that includes one or more countersignatures, certain countersignature verification operations, such as those described with regard to operation 324 and 326, may be applied to the countersignatures before declaring validity or invalidity.

If at least one certificate in the chain was determined to be invalid and there are no timestamps associated with the electronic signature, then the invalidity in the certificate chain generally indicates that the electronic signature cannot be trusted because there is no way to determine whether the certificate chain was valid at the time of signing. However, if the electronic signature is associated with timestamps, then a validation operation 316 can be initiated to determine whether the certificate chain may have been valid at any previous point in time, which would provide the evidentiary basis for relying on the electronic signature.

Accordingly, the validation operation 316 attempts to verify one or more timestamps associated with the electronic signature. In one implementation, the validation operation 316 decrypts a timestamp using the public key of the timestamp authority to obtain the digest of the electronic signature value and a time value. The validation operation 316 then determines whether the electronic signature value's digest from the timestamp matches the electronic signature value's digest decrypted from the electronic signature value. The validation operation 316 may also test a certificate chain associated with the timestamp. If the electronic signature digests match (and the certificate chain is verified), the time value represents a point in time at which the electronic signature existed in its specific form. The validation operation 316 can operate on all of the timestamps associated with the electronic signature (or at least until a timestamp satisfying the test in testing operation 322 is found).

A selection operation selects the earliest valid timestamp and records the time value as $T_1$. A determination operation 320 examines the recorded expiration/revocation dates of the certificates in the certificate chain and records the earliest invalidity time as $T_2$. A decision operation 322 test whether $T_1 < T_2$. If $T_1 < T_2$, then the certificate chain at least was valid at $T_1$ and is therefore trustworthy. Processing can proceed to verify any countersignatures associated with the electronic signature. (If no countersignatures are associated with the electronic signature then processing can proceed directly to declaration operation 328, which declares that the electronic signature was at least valid at time $T_1$ and can therefore be trusted.) If $T_1$ is not less than $T_2$, then a declaration operation 330 declares the electronic signature to be invalid (i.e., not verifiable).

If countersignatures are associated with the electronic signature, then a validation operation 324 attempts to verify all such countersignatures, using the verification techniques for electronics signatures described herein. If all of the countersignatures are verified, then the declaration operation 328 declares that the electronic signature was at least valid at time $T_1$ and can therefore be trusted. Alternatively, if one of the countersignatures is not verified, then the declaration operation 330 declares the electronic signature to be invalid (i.e., not verifiable).

Figure 4:
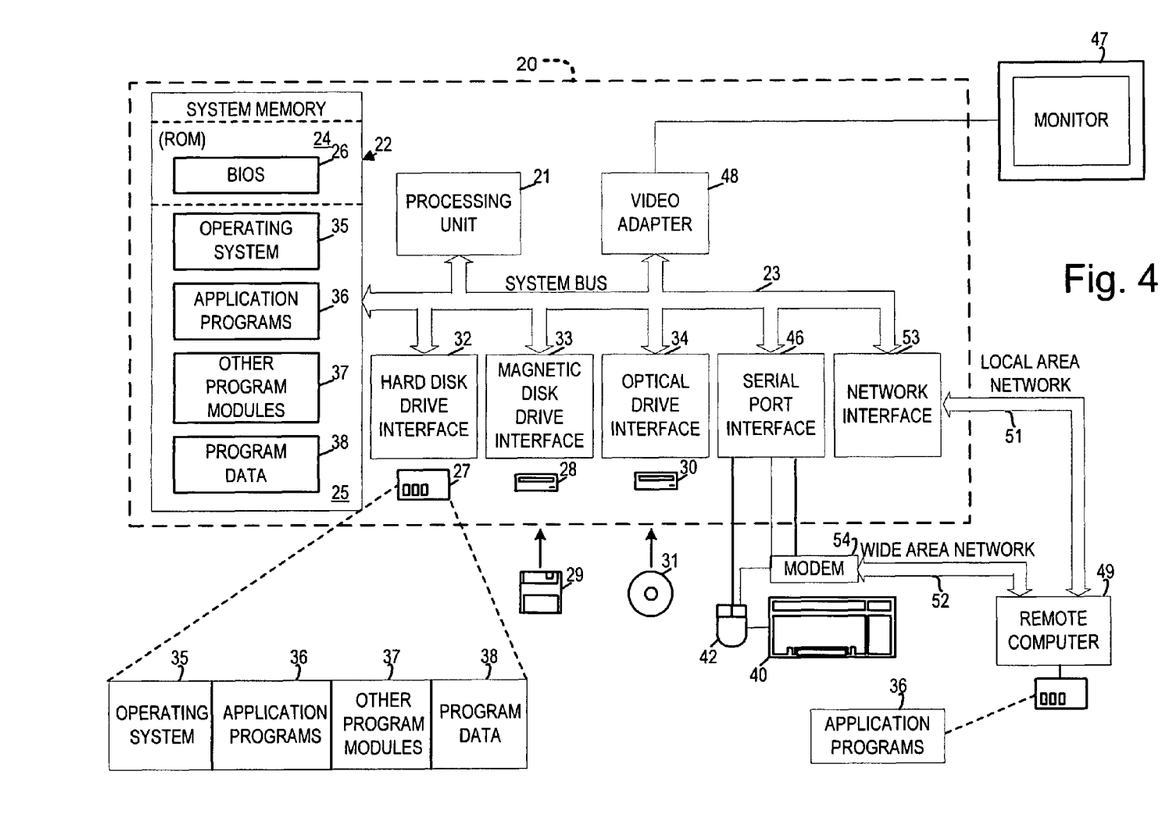
FIG. 4 illustrates an example system that may be useful in implementing the described technology.

The example hardware and operating environment of FIG. 4 for implementing the invention includes a general purpose computing device in the form of a gaming console or computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 4. The logical connections depicted in FIG. 4 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, an electronic signature verification module, a timestamp verification module, a countersignature verification module, a declaration module, a hashing module, an encryption module, a decryption module, and other modules may be embodied by instructions stored in memory 22 and/or storage devices 29 or 31 and processed by the processing unit 21. An electronic signature, a public key, a private key, a digest, a certificate, a timestamp, a countersignature, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method of verifying an electronic signature associated with and signing an electronic document, the method comprising:

receiving the electronic signature, the electronic signature comprising a signature value generated by a signer, a plurality of timestamps, and a certificate chain, wherein the electronic document comprises content data, wherein the signature value comprises an encryption by the signer's private key of a digest of the content data, wherein each timestamp comprises an encryption by a timestamp authority's private key of both a time value and a digest of the signature value, the timestamp therefore including an encrypted time value encrypted by the timestamp authority's private key, and wherein the certificate chain comprises certificates, a certificate comprising an encryption, by a private key of a certificate authority, of identity information corresponding to the signer and of the signer's public key;

determining that one or more certificates in the certificate chain are invalid;

determining an earliest invalidity time of the one or more invalid certificates;

verifying the timestamps associated with the electronic signature, the encrypted time value of each timestamp represents a time when the corresponding timestamp authority verified the electronic signature by: decrypting the digest of the content data using the signer's public key, computing a digest of the content data, and comparing the decrypted digest with the computed digest;

accessing the time value of each of the timestamps to identify the earliest valid timestamp; and declaring the electronic signature as valid if the time value of the earliest valid timestamp is earlier than the earliest invalidity time value of the one or more invalid certificates.

2. The method of claim 1 wherein the electronic signature further comprises a plurality of countersignatures and the method further comprising:

verifying the plurality of countersignatures associated with the electronic signature, and declaring the electronic signature as valid if all of the countersignatures are determined to be valid and the time value of the earliest valid timestamp is earlier than the earliest invalidity time value of the one or more invalid certificates.

3. The method of claim 1 wherein one or more of the countersignatures are certified by respective certificate chains comprised of one or more certificates, a certificate comprising an encryption, by a private key of a certificate authority, of identity information corresponding to a countersigner and of a public key of the countersigner, and the operation of verifying the countersignatures comprises:

verifying the certificates that certify a countersignature; and determining the countersignature to be valid if the one or more certificates in its chain are determined to be valid.

4. The method of claim 1 further comprising:

verifying the certificates in the certificate chain of the electronic signature, wherein a certificate is considered invalid if a certificate in the certificate chain is determined to be expired or revoked.

5. The method of claim 1 wherein an invalidity time of an invalid certificate represents a time after a validity period of the invalid certificate.

6. The method of claim 1 wherein an invalidity time of an invalid certificate represents a time at which the invalid certificate was revoked.

7. The method of claim 1 wherein the timestamps are each certified by a chain of one or more certificates and the operation of verifying the timestamps comprises:

determining whether each certificate of a timestamp is expired or revoked, wherein a timestamp is considered invalid if a certificate in its chain is expired or revoked.

8. The method of claim 1 wherein the timestamps are each certified by a chain of one or more certificates and the operation of verifying the timestamps comprises:

verifying the certificates that certify the timestamps; and determining a timestamp to be valid if the one or more certificates in its chain are determined to be valid.

9. A method of verifying an electronic signature of a document, the method comprising:

receiving the electronic signature, the electronic signature including a signature value generated by a signer of the electronic document, where the electronic document is comprised of content data, the signer having a public key and a private key, the electronic signature comprising the signature value and a plurality of countersignatures, wherein the signature value comprises an encryption by the signer's private key of a digest of the content data, the signature value therefore includes an encrypted time value encrypted by the timestamp authority's private key, wherein each countersignature comprises an encryption by a countersigner's private key of a digest of the signature value;

identifying, from among signed timestamps included in the electronic signature, an earliest valid timestamp, each signed timestamp including a signed time value signed by a private key of a timestamp authority, wherein each timestamp represents a time when the corresponding timestamp authority verified the electronic signature by: decrypting the digest of the content data using the signer's public key, computing a digest of the content data, and comparing the decrypted digest with the computed digest;

verifying validity of the plurality of countersignatures included as part of the electronic signature;

identifying the earliest valid signed timestamp; and issuing a declaration of an earliest time of validity of the electronic signature if all of the countersignatures are determined to be valid, where the declared earliest time of validity of the digital signature is set to a time value of the identified earliest valid signed timestamp.

10. The method of claim 9 wherein one or more of the countersignatures are certified by a chain of one or more certificates and the operation of verifying the countersignatures comprises:

verifying the certificates that certify the countersignatures; and determining a countersignature to be valid if the one or more certificates in its chain are determined to be valid.

11. The method of claim 9 further comprising:

verifying the certificates in the certificate chain of the electronic signature, wherein a certificate is considered invalid if a certificate in the certificate chain is expired or revoked.

12. The method of claim 9 wherein the electronic signature includes an electronic signature value provided by a signer and further comprising verifying the electronic signature value using a public key of the signer.

13. A computer-readable medium having computer-executable instructions for performing a computer process that implements the operations recited in claim 9.

14. A system comprised of one or more processors and memory of corresponding one or more computers for verifying an electronic signature associated with and signing an electronic document, the system comprising:

a receiving module stored by the memory and executed by the one or more processors, the receiving module receiving the electronic signature, the electronic signature comprising a signature value generated by a signer of the electronic document, the signer having a public key and a private key, a plurality of timestamps, and a certificate chain, wherein the electronic document comprises content data, wherein the signature value comprises an encryption by the signer's private key of a digest of the content data, wherein each timestamp comprises an encryption by a timestamp authority's private key of both a time value and a digest of the signature value, each timestamp therefore including an encrypted time value, and wherein the certificate chain comprises certificates, a certificate comprising an encryption, by a private key of a certificate authority, of identity information corresponding to the signer and of the signer's public keys;

a timestamp verification module stored by the memory and executed by the one or more processors, where the timestamp verification module determines that one or more certificates in the certificate chain are invalid, stores an earliest invalidity time value of the one or more invalid certificates, verifies the timestamps associated with the electronic signature, looks for the earliest valid timestamp according to their time values, and records the time value of the earliest valid timestamp, wherein each timestamp represents a time when the corresponding timestamp authority verified the electronic signature by: decrypting the digest of the content data using the signer's public key, computing a digest of the content data, and comparing the decrypted digest with the computed digest; and a declaration module stored by the memory and executed by the one or more processors, where the declaration module declares the electronic signature as valid if the time value of the earliest valid timestamp is earlier than the earliest invalidity time value of the one or more invalid certificates.

15. The system of claim 14 wherein the electronic signature is associated with a plurality of countersignatures and further comprising:

a countersignature verification module that verifies the plurality of countersignatures associated with the electronic signature, wherein the declaration module declares the electronic signature as valid if all of the countersignatures are further determined to be valid.

16. The system of claim 15 wherein one or more of the countersignatures are certified by a chain of one or more certificates and the countersignature verification module further verifies the certificates that certify the countersignatures and determines a countersignature to be valid if the one or more certificates in its chain are determined to be valid.

17. The system of claim 14 further comprising:
an electronic signature verification module that verifies the certificates in the certificate chain of the electronic signature, wherein a certificate is considered invalid if a certificate in the certificate chain is expired or revoked.

18. The system of claim 14 wherein the electronic signature includes an electronic signature value provided by a signer and further comprising an electronic signature verification module that verifies the electronic signature value using a public key of the signer.

* * * * *